(12) United States Patent
Wasilousky

(10) Patent No.: US 7,518,779 B2
(45) Date of Patent: Apr. 14, 2009

(54) ACOUSTO-OPTIC DEVICES HAVING EXTENDED TEMPERATURE RELIABILITY

(75) Inventor: Peter A. Wasilousky, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 124 days.

(21) Appl. No.: 11/697,326

(22) Filed: Apr. 6, 2007

(65) Prior Publication Data

US 2008/0247031 A1    Oct. 9, 2008

(51) Int. Cl.
G02F 1/11    (2006.01)
G02F 1/01    (2006.01)
(52) U.S. Cl. ........................... 359/285; 359/240
(58) Field of Classification Search ............... 359/285
See application file for complete search history.

(56) References Cited

U.S. PATENT DOCUMENTS

| | | | | |
|---|---|---|---|---|
| 3,572,899 | A | 3/1971 | Bell, Jr. ..................... 350/161 |
| 4,256,362 | A | 3/1981 | Bardos ...................... 350/3.86 |
| 4,381,887 | A * | 5/1983 | Guerin et al. ............... 359/311 |
| 4,671,620 | A | 6/1987 | Yao ........................... 350/358 |
| 4,815,802 | A | 3/1989 | Nakamura ............... 350/96.13 |
| 4,827,229 | A | 5/1989 | Sabet-Peyman et al. ..... 333/187 |
| 4,908,543 | A | 3/1990 | Sabet-Peyman ............. 310/334 |
| 4,995,693 | A * | 2/1991 | Wilson ........................... 385/7 |
| 5,251,058 | A * | 10/1993 | MacArthur ................. 359/249 |
| 5,923,460 | A | 7/1999 | Stewart et al. .............. 359/305 |
| 6,320,989 | B1 | 11/2001 | Montgomery et al. .......... 385/7 |
| 6,424,451 | B1 * | 7/2002 | Chang ........................ 359/308 |
| 6,487,324 | B2 | 11/2002 | Montgomery et al. .......... 385/7 |
| 6,538,690 | B1 | 3/2003 | Montgomery et al. ........ 348/198 |
| 6,765,709 | B1 | 7/2004 | Montgomery et al. |
| 6,870,658 | B2 | 3/2005 | Wasilousky et al. ......... 359/285 |
| 2004/0151422 | A1 | 8/2004 | Shah ........................... 385/17 |
| 2004/0257636 | A1 * | 12/2004 | Shibuya et al. .............. 359/305 |
| 2008/0180782 | A1 * | 7/2008 | Kump et al. ................. 359/285 |

OTHER PUBLICATIONS

Jemison et al., "*Acousto-Optic Control of MMIC T/R Modules for Phased Array Beamsteering*," IEEE MTS International Microwave Symposium Digest, vol. 2, Jun. 14, 1993, pp. 1051-1054.

Perennou et al., "*Electric Phase Controlled for an Acousto-Optic Switch Using Phased Array Transducers*," Proceedings of the SPIE, The International Society for Optical Engineering SPIE, vol. 4870, 2002, pp. 410-417.

* cited by examiner

*Primary Examiner*—Jordan M. Schwartz
*Assistant Examiner*—James C Jones
(74) *Attorney, Agent, or Firm*—Allen, Dyer, Doppelt, Milbrath & Gilchrist, P.A.

(57) ABSTRACT

An acousto-optic modulator includes an acousto-optic bulk medium and transducer attached to the acousto-optic bulk medium. The transducer includes an electrode circuit and plurality of piezoelectric platelet segments attached to the bulk medium and supporting the electrode circuit. The piezoelectric platelet segments are configured for reducing shear stress and susceptibility to fracture due to temperature extremes.

12 Claims, 9 Drawing Sheets

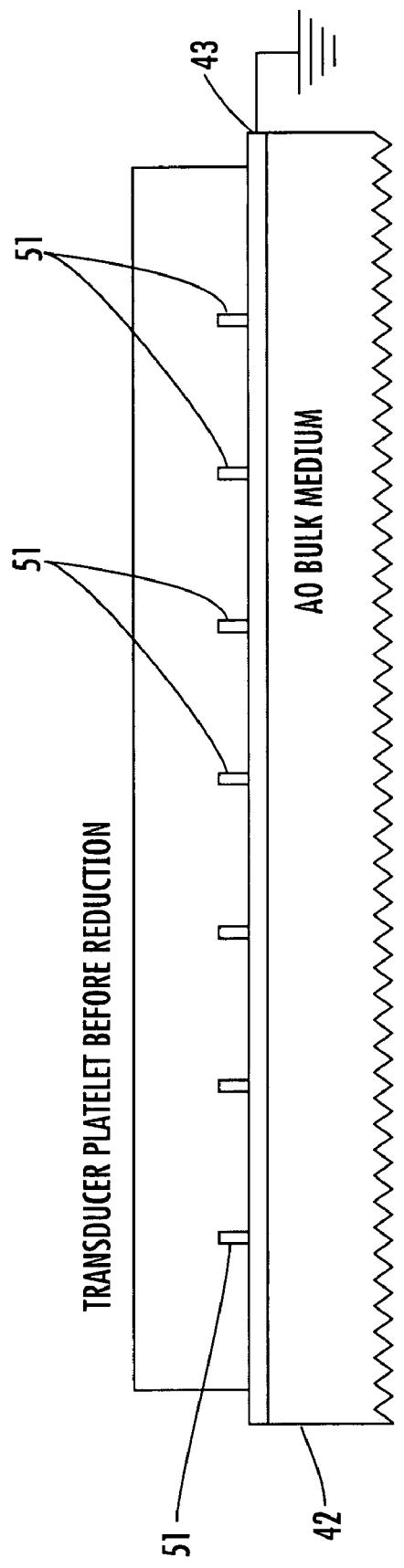
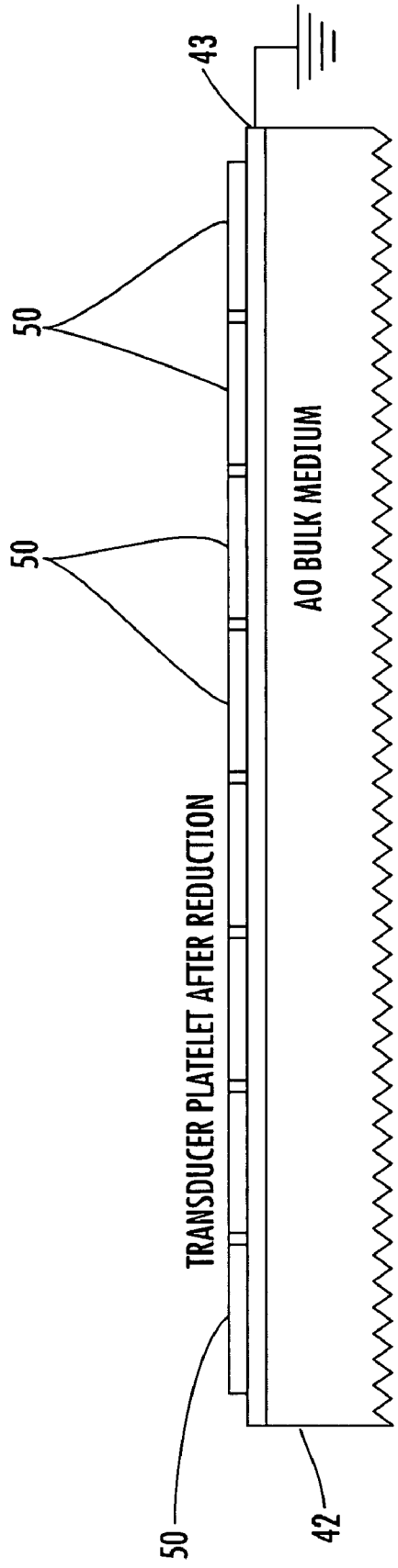

ACOUSTO-OPTIC DEVICES HAVING EXTENDED TEMPERATURE RELIABILITY

FIELD OF THE INVENTION

The present invention relates generally to optical modulation systems and related components, and more particularly, to acousto-optical modulators and similar devices that modulate light beams using the acousto-optic effect.

BACKGROUND OF THE INVENTION

Acousto-optic modulators, sometimes referred to as Bragg cells, diffract and shift light using sound waves at radio frequency. These devices are often used for Q-switching, signal modulation in telecommunications systems, laser scanning and beam intensity control, frequency shifting, and wavelength filtering in spectroscopy systems. Many other applications lend themselves to using acousto-optic devices.

In such acousto-optic devices, a piezoelectric transducer, sometimes also referred to as an RF transducer, is secured to an acousto-optic bulk medium as a transparent optical material, for example, fused silica, quartz or similar glass material. An electric RF signal oscillates and drives the transducer to vibrate and create sound waves within the transparent medium which effect the properties of an optical field in the medium via the photo elastic effect, in which a modulating strain field of an ultrasonic wave is coupled to an index of refraction for the acousto-optic bulk medium. As a result, the refractive index change in amplitude is proportional to that of sound.

The index of refraction is changed by moving periodic planes of expansion and compression in the acousto-optic bulk material. Incoming light scatters because of the resulting periodic index modulation and interference, similar to Bragg diffraction.

A piezoelectric transducer can create the sound waves and the light beam is diffracted into several orders. It is possible to vibrate a bulk medium with a sinusoid signal and tilt the acousto-optic modulator such that light is reflected from flat sound waves into a first diffraction order to result in a high deflection efficiency.

In acousto-optic devices, light can usually be controlled by: 1) deflection, 2) intensity, 3) frequency, 4) phase, and 5) polarization.

In acousto-optic systems using deflection, a diffracted beam emerges at an angle depending on the wavelength of the light relative to the wavelength from the sound. When controlling light by intensity, however, the amount of light diffracted by sound depends on the intensity of the sound to modulate the intensity of the light in the diffracted beam. With frequency control over the light, the frequency of the diffracted beam is Doppler-shifted by an amount equal to the frequency of the sound wave, as compared to Bragg diffraction, in which light is scattered from moving planes. The frequency shift can also occur because the energy and momentum of photons and phonons is conserved. Frequency shifts can vary from as little as 20 MHz to as much as 400 MHz or with even greater ranges in some cases. Two acoustic waves can travel in opposite directions in the material and create a standing wave, which does not shift the frequency. In systems controlling light using phase, the diffracted beam can be shifted by the phase of the sound wave. In systems controlling light by polarization, collinear transversal acoustic waves are perpendicular along longitudinal waves to change polarization. Thus, there could occur a birefringent phase-shift.

Acousto-optic modulators are preferred in many applications because they are faster than tiltable mirrors and other mechanical devices. The time it takes for the acousto-optic modulator to shift an exiting optical beam is limited to the transit time of the sound wave. The acousto-optic modulators are often used in Q-switches where a laser produces a pulsed output beam at high peak power, typically in the Gigawatt range. This output could be higher than lasers operating a continuous wave (CW) or constant output mode.

Examples of acousto-optic modulator devices and similar acousto-optic systems are disclosed in commonly assigned U.S. Pat. Nos. 4,256,362; 5,923,460; 6,320,989; 6,487,324; 6,538,690; 6,765,709; and 6,870,658, the disclosures which are hereby incorporated by reference in their entirety.

Conventional acousto-optic devices typically rely on the use of large and costly hybrid output radio frequency (RF) amplifiers to provide the requisite drive power necessary for use in operation of the device. Usually a higher supply voltage is applied in order to accommodate the requisite output intercept point of the hybrid output radio frequency amplifiers. This results in the use of additional and/or more costly power supplies to meet both the integrated circuit (IC) and radio frequency amplifier requirements.

In other applications of conventional acousto-optic devices, the designs typically incorporate one or more monolithic piezoelectric platelets, which are bonded to the bulk medium for launching an ultrasonic strain field into the bulk medium. In some examples, a low compliance alloy bond fuses the two components together providing an interface, which results in lower acoustic losses, while accommodating broadband impedance matching between the platelet and the optical, bulk medium. The combination of different coefficient-of-thermal expansion (CTE) for the platelet and optical medium, coupled by the low compliance interface, may lead to stress causing localized shear CTE expansion mismatch induced fracture and failure of large platelet acousto-optic devices subjected to extended temperature conditions. These extended temperature conditions may occur both in a non-operable state, i.e., at a survivability storage temperature, or in some cases as a result of high-level signal conditions.

Some critical applications using acousto-optic devices modulate the intensity of an optical beam. This modulation can create small deviations in the output angle of the diffracted beam because of the local thermal transients introduced when the RF modulation waveform to the device is turned ON and OFF. These thermal transients can negatively impact the resolution of the focused spot, which can be produced.

SUMMARY OF THE INVENTION

An acousto-optic modulator includes an acousto-optic bulk medium and transducer attached to the acousto-optic bulk medium. The transducer includes an electrode circuit and plurality of piezoelectric platelet segments attached to the bulk medium and supporting the electrode circuit. A ground plane is positioned between the piezoelectric platelet segments and the acousto-optic bulk medium. The platelet segments are generated without separating or otherwise affecting the common ground metal between the individual platelet segments and the acousto-optic bulk medium. The piezoelectric platelet segments are configured for reducing shear stress and susceptibility to fracture due to temperature extremes.

The electrode circuit can be formed as a linear array electrode such that each piezoelectric platelet segment supports a respective electrode. The transducer driver can be formed by a plurality of amplifiers connected to the electrodes such that each electrode is driven by a respective single amplifier to impart beam steering. Each amplifier is preferably formed in one aspect of the present invention as a monolithic microwave integrated circuit (MMIC). The transducer driver can establish the amplitude and phase of each waveform imparted by an electrode.

In yet another aspect, a direct digital synthesizer (DDS) circuit can output arbitrary waveforms to each platelet segment, to provide individual phase and amplitude control can be performed. The DDS circuit can be formed as a phase accumulator and one or more discrete memory devices and digital-to-analog converters. The phase accumulator could be formed as a complex programmable logic device to provide address generation for the various memory devices. Each digital-to-analog converter (DAC) is connected to up to 10 bits of a given memory device output prior to filtering and input to each amplifier. As a result, one 128-bit Dynamic Random Access (DRAM) Memory Bank can provide 12 discrete output channels, which support individual phase and amplitude offsets to each respective transducer platelet segment.

BRIEF DESCRIPTION OF THE DRAWINGS

Other objects, features and advantages of the present invention will become apparent from the detailed description of the invention which follows, when considered in light of the accompanying drawings in which:

FIGS. 5 and 6 are fragmentary views showing the piezoelectric platelet before reduction and after reduction to form the segmented piezoelectric platelet in accordance with a non-limiting example of the present invention.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
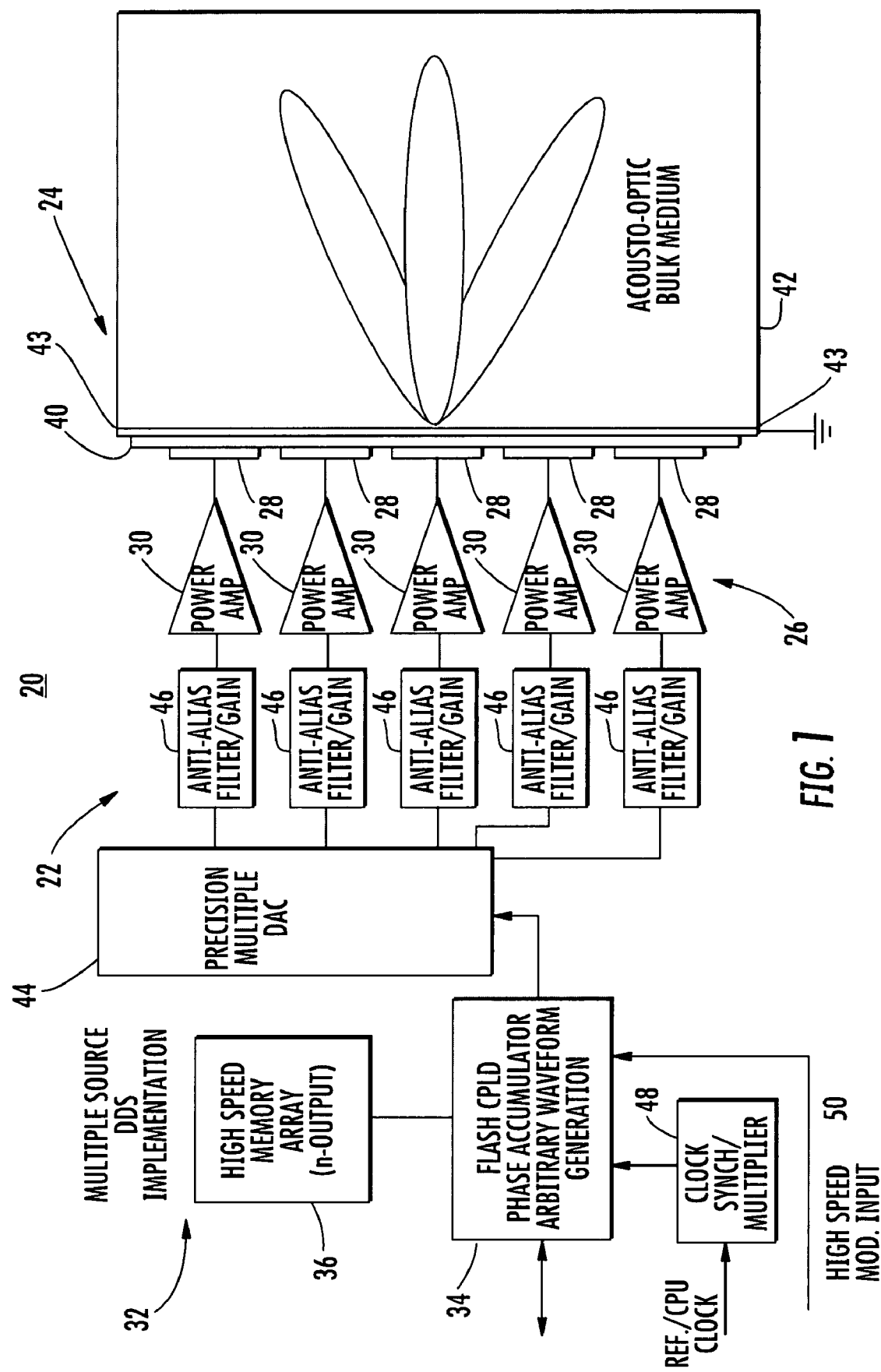
FIG. 1 is a high-level block diagram of an acousto-optic modulator using a linear electrode array for a transducer in accordance with a non-limiting example of the present invention.

FIG. 1 is a block diagram of an acousto-optic modulator 20 and showing a transducer driver 22 for an acousto-optic device 24 as an acousto-optic modulator in accordance with a non-limiting example of the present invention. The acousto-optic modulator 20 shown in FIG. 1 overcomes the disadvantages of conventional acousto-optic modulators that rely on large and costly hybrid output RF amplifiers to provide a requisite drive power necessary for useful operation of the device. In these prior art devices, a higher supply voltage than is typically used for a majority of the circuitry is normally required to accommodate the requisite output intercept point of hybrid output RF amplifiers. This results in one or both of additional and more costly power supplies to meet the power requirements and supply voltages of the driver integrated circuits (IC's) and RF amplifier output.

Current approaches for providing the RF driving excitation for operation of an acousto-optic modulator and/or similar device typically rely on the use of hybrid RF amplifiers to supply sufficient RF power to a common piezoelectric electrode used in a conventional acousto-optic modulator in order to operate properly. The total REF drive power requirement is determined by the characteristics of the acousto-optic interaction being sought, which in turn determines the amplitude and geometric extent of the strain field that must be produced in the interaction medium.

In many acousto-optic modulators, the emitter (i.e., electrode) drive power and operating carrier frequencies largely precluded the use of traditional video IC components used with pulsed, ultrasound imaging systems. Acousto-optic devices typically required low impedance linear sources that were capable of sourcing significantly more current than for diagnostic ultrasound imaging array applications. In the embodiment of the invention described here, the use of low cost monolithic RF (MMIC) components in conjunction with a transducer array is required to produce the requisite optical phase retardation consistent with emitter power and impedance considerations. Other phased array approaches for acousto-optic devices have focused on the acousto-optic interaction benefits obtained in terms of increased bandwidth and efficiency using a conventional RF amplifier system to drive a transducer array.

In accordance with a non-limiting example of the present invention, a piezoelectric oscillator, e.g., transducer, is formed as an electrode structure 26 (FIG. 1) and is broken into a discrete linear array of individual electrodes 28, also generally termed emitters. Each individual electrode 28 is driven by a low cost, monolithic RF amplifier 30 as illustrated. The number of electrodes 28 is typically determined to be consistent with a suitable radiation resistance, so as to limit the maximum element drive power required to facilitate the use of a plurality of monolithic output RF amplifiers.

Because the interaction between the light and sound is an integrated effect, the amplitude of the phase retardation produced in the optical field is equivalent to the use of a single large transducer so long as all emitters, i.e., electrodes, maintain a high degree of synchronism. Because each amplifier supplies only a fraction of the necessary RF power, the supply voltage is also reduced by approximately the square root of the number of emitters, i.e., electrodes. In addition, the total capacitance of the conventional transducer electrode no longer becomes a limiting factor in the length of the interaction region that can be used, because the capacitance and corresponding radiation resistance of the array elements are now independent of the total interaction length.

An extension of this linear drive system is provided by the plurality of monolithic amplifiers 30, when used in conjunction with a direct digital synthesizer (DDS) circuit as a drive controller, illustrated generally at 32, which can set both the amplitude and phase of each emitter drive waveform in real time. By using low cost DDS IC components, or a dedicated phase accumulator 34 and high speed memory circuit 36, precise phase and amplitude adjustments may be made to each electrode 28, allowing the majority of acoustic energy to be directed into a single, steerable, boresight radiation lobe. This maintains phase matching between the incident light and sound field and achieves significant gains in scattering efficiency, deflection linearity, and high resolution tunable filtering. The acousto-optic modulator 20 may also implement phase only modulation of light intensity, as will be explained below.

Some systems using phased array approaches for acousto-optic devices, have addressed these benefits using conventional single drive approaches, resulting in partial phase matching via one of two principal radiation lobes, or by using bi-phase emitter excitation into one principal lobe using a difficult blazing process. Neither approach addresses the drive methodology nor impedance limitations imposed by large arrays. These systems also do not address the ability to steer and provide real time correction of phase errors introduced by the drive circuitry, dedicated phase only modulation of light intensity, and angular compensation for acoustic anisotropy. They do not address non-linear scan versus frequency artifacts introduced by geometric imperfections in the optical system.

The system 20, in accordance with a non-limiting example of the present invention, uses a plurality of monolithic RF amplifiers 30 in conjunction with a linear electrode array 26, to offer a lower cost implementation and provide the requisite RF drive waveform for acousto-optic applications, while also reducing the necessary supply voltage and increasing overall reliability.

The driver 22 adjusts the phase and amplitude of the RF drive waveform to allow weighting and steering of a single, principal acoustic radiation lobe and provide enhanced bandwidth, scattering efficiency, phase-only modulation. It also corrects for phase errors and non-ideal scan artifacts inherent in the system hardware.

The driver 22 as described can be applied directly to the design of acousto-optic modulators and related components, including those systems used by semiconductor mask equipment vendors, original equipment manufacturers (OEM) for laser equipment, and different technology and government customers. It can be used in the development of high resolution and low power acousto-optic tunable filters (AOTF).

Referring again to FIG. 1, more detailed components of the acousto-optic modulator 20 are explained. The acousto-optic device 24 includes the linear electrode array 26 positioned on a monolithic piezoelectric platelet 40 in this example and acousto-optic bulk medium 42. The electrodes 20 are formed in a linear array on the piezoelectric platelet 40, which connects to the acousto-optic medium bulk 42 via a ground plane 43. The phase accumulator 34 can be formed as a flash complex programmable logic device (CPLD) and is operative as a phase accumulator and arbitrary waveform generator. It inputs signals to the high speed memory array 36 having an n-output, wile also inputting signals to a precision, multiple digital-to-analog converter (DAC) 44 as illustrated. Typically, the flash CPLD 34 can be formed from macro cells that contain logic for implementing disjunctive expressions or more specialized logic. It could be formed from programmable array logic (PLA) circuits and field programmable gate array (FPGA) circuits.

The DAC 44 inputs to a plurality of anti-alias filter/gain circuits 46, each connected to a monolithic power amplifier 30 and respective electrode 28, as explained before. The electrodes 28 form a discrete linear array that connects to the piezoelectric platelet 40 and acousto-optic bulk medium 42. Thus, each electrode is driven by a low cost monolithic RF amplifier. A system clock may be used in conjunction with a clock synchronizer and multiplier circuit 48 to provide the requisite clock signal to the CPLD 34, which also receives a signal as a high-speed modulator input 50.

Each power amplifier 28 could be formed as a high performance MMIC amplifier, such as a Sirenza micro device SBB-2089Z circuit. This device is a high performance InGaP HBT MMIC amplifier using a Darlington configuration and active bias network to provide stable current over temperature and process beta variations. It can operate from a 5V supply. It does not require a dropping resistor as compared to typical Darlington amplifiers. It has high linearity 5V gain block applications that require small size and minimal external components. It is internally matched to 50 ohms.

The circuit can operate from about 50-850 MHz and is cascadable and active biased. It is available in lead free, ROHS compliant packaging with IP3=42.8 dBm @ 240 MHz. Other specifications include: (a) P1dB=20.8 dBm @ 500 MHz; (b) single fixed 5V supply; (c) robust 1000V ESD, class 1C; (d) low thermal resistance; and (e) MSL 1 moisture rating.

It should be understood that the direct digital synthesis (DDS) circuit could include different components than those illustrated, but basically would include a clock, phase accumulator, memory and DAC. In some implementations such as for application to the bi-phase RF Modulation technique described below, a dual channel or two single DDS IC's may be used in conjunction with one or more clock distribution buffer IC's, to form two separate interdigitated linear transducer array's, so that the phase of each array may be changed in a manner described below. In discrete implementations of the RF driver which support the use of multiple low cost MMIC amplifiers feeding a transducer array as described, an electronic controller or other system could fill the memory with data, with each data item representing the amplitude of the signal as a binary word at an instant of time. A counter as a phase accumulator can advance by increments on each pulse from a frequency reference, and output as the phase, to select each item in a data table. The DAC will convert this sequence of data to an analog waveform.

It should also be understood that individual integrated circuits (IC's) can be used with elements integrated into individual core chip functions and use multiple chips. Any synthesizers would be synchronized with respect to the common clock synchronizer and multiplier 48. The power amplifiers 30 could be distributed and used as a phased array and coherent approach to provide multiple coherent RF sources. It is also possible to use a plurality of direct digital synthesizers as integrated circuits or a combination, all deriving their common core logic from a common clock.

Figure 2:
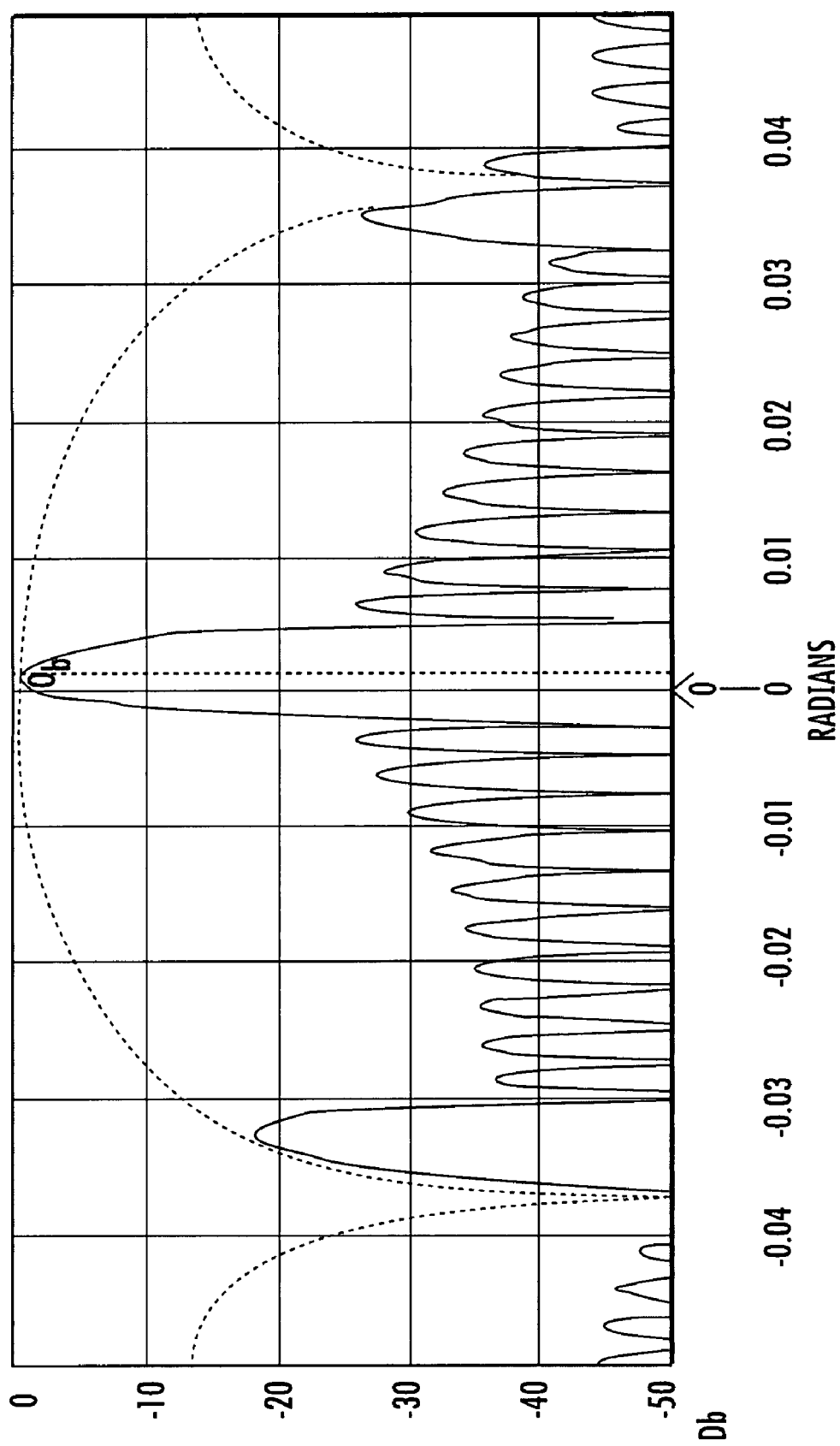
FIG. 2 is a graph showing the acoustic spectrum performance, which results for the transducer and linear electrode array in accordance with the non-limiting example shown in FIG. 1.
Figure 3:
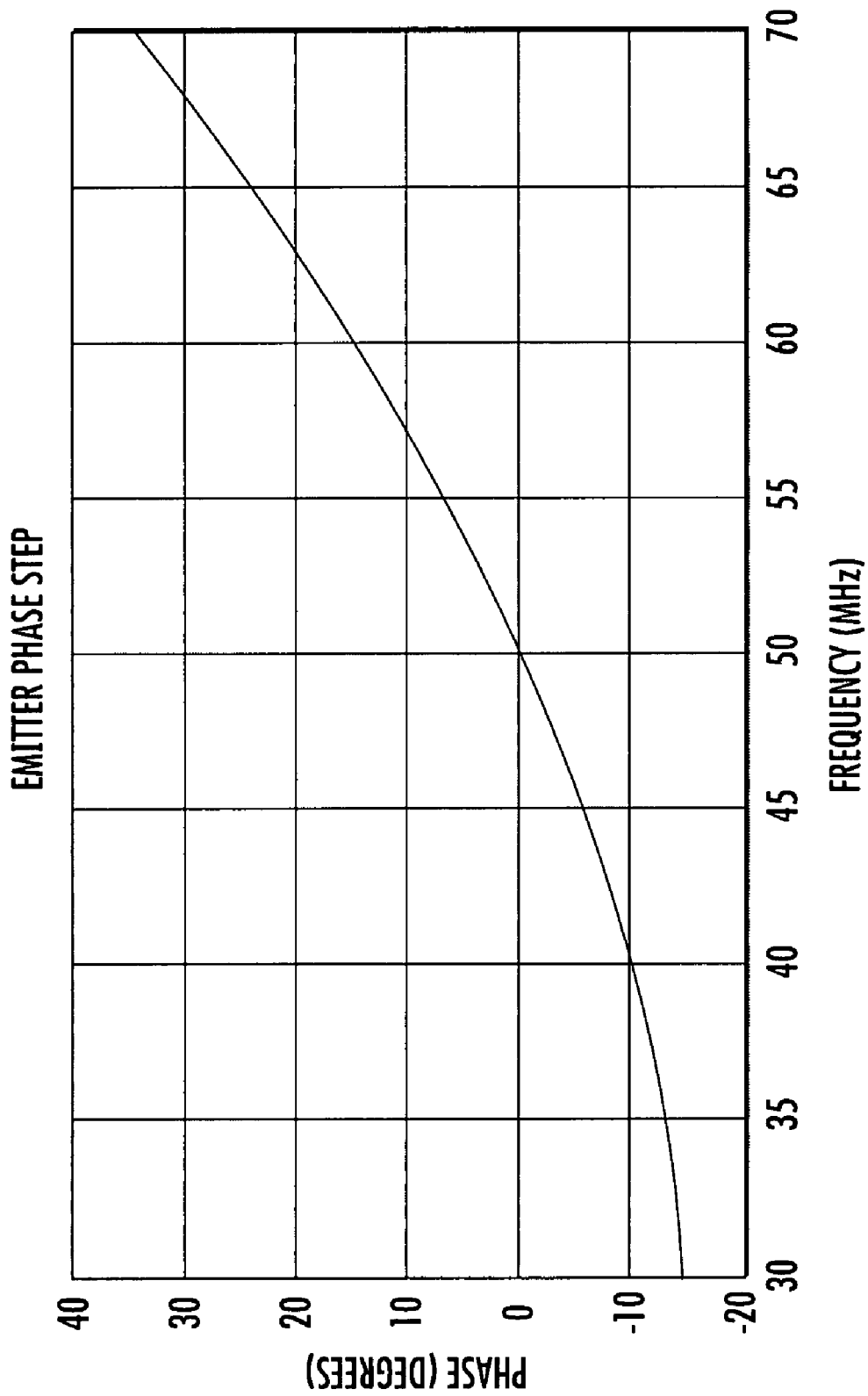
FIG. 3 is a graph showing phase in degrees relative to an emitter phase step and frequency for the acousto-optic modulator using the linear electrode array shown in FIG. 1, in accordance with a non-limiting example of the present invention.

FIGS. 2 and 3 are graphs showing the acoustic spectrum and adjacent element drive phase performance of the acousto-optic modulator 20 illustrated in FIG. 1. As noted before, the modulator 20 uses low cost monolithic amplifiers, which are nominally matched to a load which has a radiation impedance defined by an electrode. The total array size is no longer limited by the total capacitance of the transducer, as the radiation impedance may be tailored by choosing an appropriate element size. As a result, there is no requirement to section or flip the electrodes to raise the overall radiation resistance to improve the electrical bandwidth capability of the device. Beam steering can be effected to maintain phase matching between the light and sound field with an order of magnitude increase in scattering efficiency obtainable in some cases. Improvements in narrow band spectral filtering are achievable and bi-phase RF modulation as described below for thermal control is possible. The system has a higher reliability and simplified design than some available designs.

FIG. 2 is a graph that illustrates the beam steering inside the crystal as the acousto-optic bulk medium that occurs by changing the phase of the individual electrodes produced by the DDS drive circuit 22. The driver as illustrated and described above can be used to steer the beam around the acousto-optic bulk medium. The dashed line to the right of the zero radiance line illustrates the function as described with the beam steering.

FIG. 3 is a graph that shows a typical value for the phase change between adjacent electrodes that must be applied at a given frequency to keep the beam matched between the light and sound field.

Figure 4:
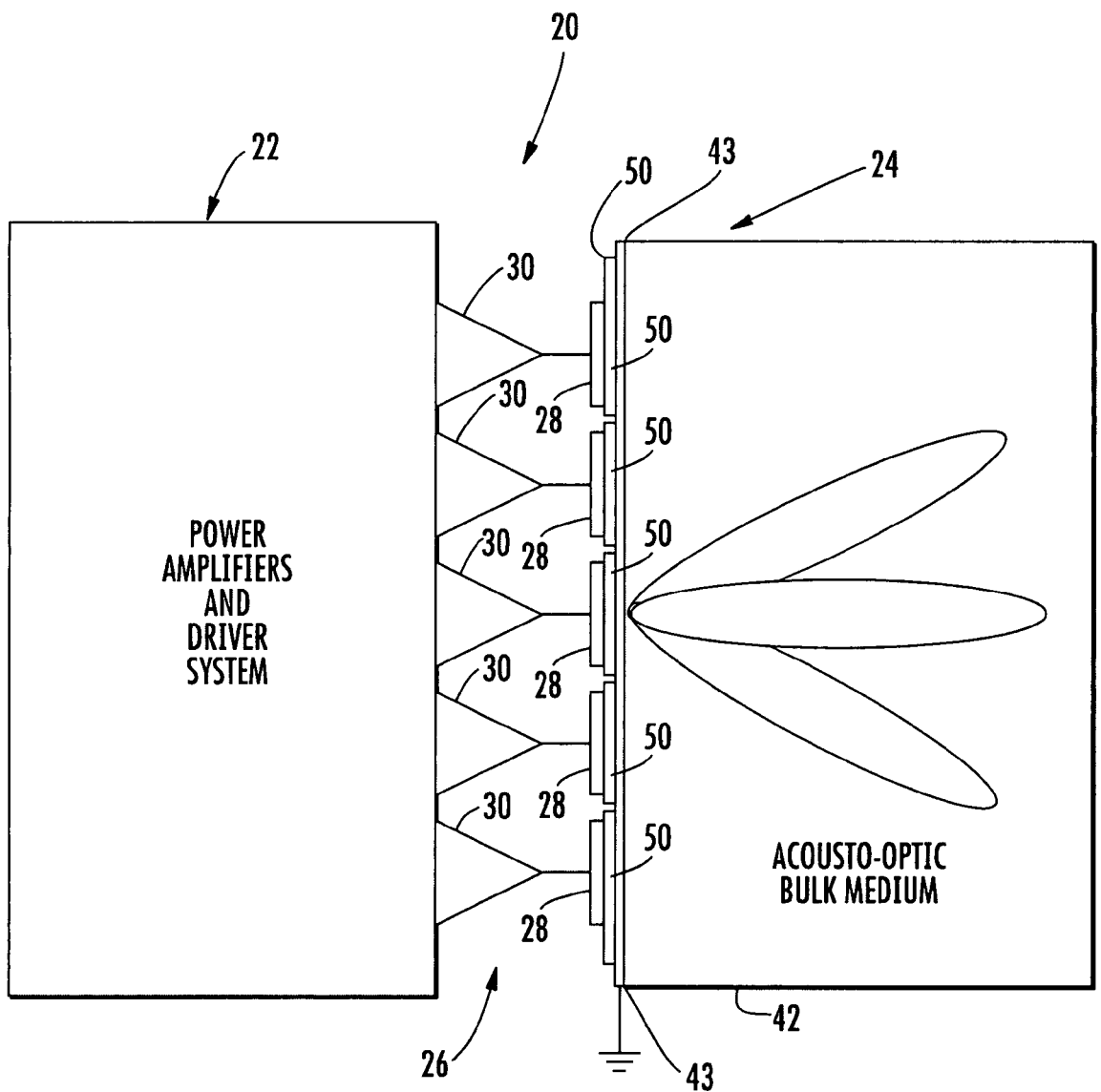
FIG. 4 is a high-level block diagram of another embodiment of an acousto-optic modulator similar to FIG. 1 and showing a segmented piezoelectric platelet array attached to the ground plane and acousto-optic bulk medium in accordance with a non-limiting example of the present invention.

FIGS. 4-6 illustrate an acousto-optic modulator that extends the temperature reliability of such system and enhances survivability under harsh environments using a segmented (transducer) piezoelectric platelet. Common elements as described relative to FIG. 1 are given the same reference numeral with reference to FIGS. 4-6.

Conventional acousto-optic devices typically incorporate one or more monolithic piezoelectric platelets, which are bonded to the suitable transparent bulk medium for launching the ultrasonic strain field into the bulk medium. These platelets are formed using materials typically known to those skilled in the art. Usually, a low compliance alloy bond fuses the two components together to provide an interface, which results in low acoustic losses while accommodating broad-band impedance matching between the platelet and optical bulk medium. A ground plane is typically included. The combination of different coefficient of thermal expansion (CTE) for the platelet and optical bulk medium, coupled by the low compliance interface, may lead to stress, creating localized shear CTE mismatch, and resulting in fracture and failure of large platelets and acousto-optic devices when subjected to extended temperature conditions. These extended temperature conditions may occur both in a non-operable state, i.e., at a survivability storage temperature, or as a result of high-level signal conditions.

Some prior art approaches for extending the survivability temperature of these acousto-optic devices during non-operating storage conditions use active thermal resistance heaters or thermoelectric peltier devices to limit the temperature variation seen by critical device interfaces. Similar approaches, in conjunction with careful passive thermal design, are also used during active operation of the device to minimize the temperature extreme at which the transducer is allowed to operate.

The modulator shown in FIGS. 4-6 has the monolithic piezoelectric transducer platelet broken into an array of segmented piezoelectric "tiles" 50. Fine cuts 51 made in the polished piezoelectric transducer platelet prior to bonding appear as individually bonded "tiles" 50 after reduction of the platelet to the proper resonant thickness as shown in FIG. 6. It should be understood that the electrodes could be individually driven as an array or electrically connected together and driven as a single monolithic transducer.

Because the total differential elongation which would normally occur at the free boundary between transducer platelet elements and the substrate as the bulk medium is smaller by virtue of a reduction in the individual lateral dimensions of the transducer segments, the constrained boundary produced by the vacuum alloying of metals, builds up a smaller amount of shear stress when compared with the larger conventional transducer structure. As a result, the fracture limit of these crystalline materials is less likely to be reached at a given temperature extreme than that at which the bond was formed.

This approach to extending the temperature reliability of the acousto-optic device is passive in nature, requiring no active system during storage to enhance survivability over extremes in the ambient temperature, which may be encountered. Also, higher power applications which reduce the lifetime of the device bond due to thermally generated stress, related fracture, and bond delamination may also benefit from the reduction in the magnitude of the total stresses which are generated at the bond interface.

This structure can be applied to acousto-optic modulator components, including various laser cavity devices and medium-powered, air-cooled, Q-switch devices. The structure can also be used in space qualification applications.

FIG. 4 shows the acousto-optic modulator 20 in which the acousto-optic bulk medium 42 includes the segmented electrodes 28 and the segmented piezoelectric "tiles" 50 produced from the transducer platelet. Each electrode 28 and "tiled" transducer platelet 50 is connected to the respective power amplifier 30, together with the other circuit components shown in FIG. 1 and represented generally by the block 22 corresponding to the power amplifier and driver.

FIG. 5 shows the transducer platelet before reduction, while FIG. 6 shows the transducer platelet after reduction.

By segmenting the transducer platelet, more room is allowed for differential expansion. The smaller distance fitted by the "tiling" reduces any "build-up" of stress. FIG. 5 shows the transducer platelet before reduction such that the transducer platelet could be about 0.030 to about 0.040 inches thick before cutting. It is possible to predefine or precut the cuts at a depth of about 0.002 to about 0.003 inches thick, i.e., about 50 to about 75 microns, such that the transducer platelet can be reduced to a resonant thickness, which is about a half wavelength acoustic thickness at the frequency of interest. Typically, this could be about 20 to about 50 microns as the desired thickness. By making the cuts about 50 to about 75 microns thick when the transducer platelet is reduced as shown in FIG. 6, the cuts will be at the desired spacing.

During manufacturing, a large number of potential transducer platelets could be cut to a depth of about 200 to about 150 microns, or about 0.004 inches, to ensure that different transducer platelets can be used and reduced to a resonant thickness.

It is desirable to cut the transducer platelet before adhering it to a ground plane or bulk medium because if any cuts are made after the transducer platelet is adhered, the ground plane could be accidentally cut. It is also possible to use an etch ion mill process, a mask or sputter process, and ion beam process for small geometries. Harmonic saws could also be used to obtain geometries that are about 0.003 to about 0.005 inches.

During manufacturing, the ground plane should be protected. It operates similar to a capacitor in conjunction with other components and should not be cut. The size of the gap relative to the size of the platelet can be important in some applications. Because sidelobes are generated with acoustic diffraction patterns, energy can be removed in angles that are undesirable unless the cuts are small relative to the width of the electrode to counter such effects.

Figure 7:
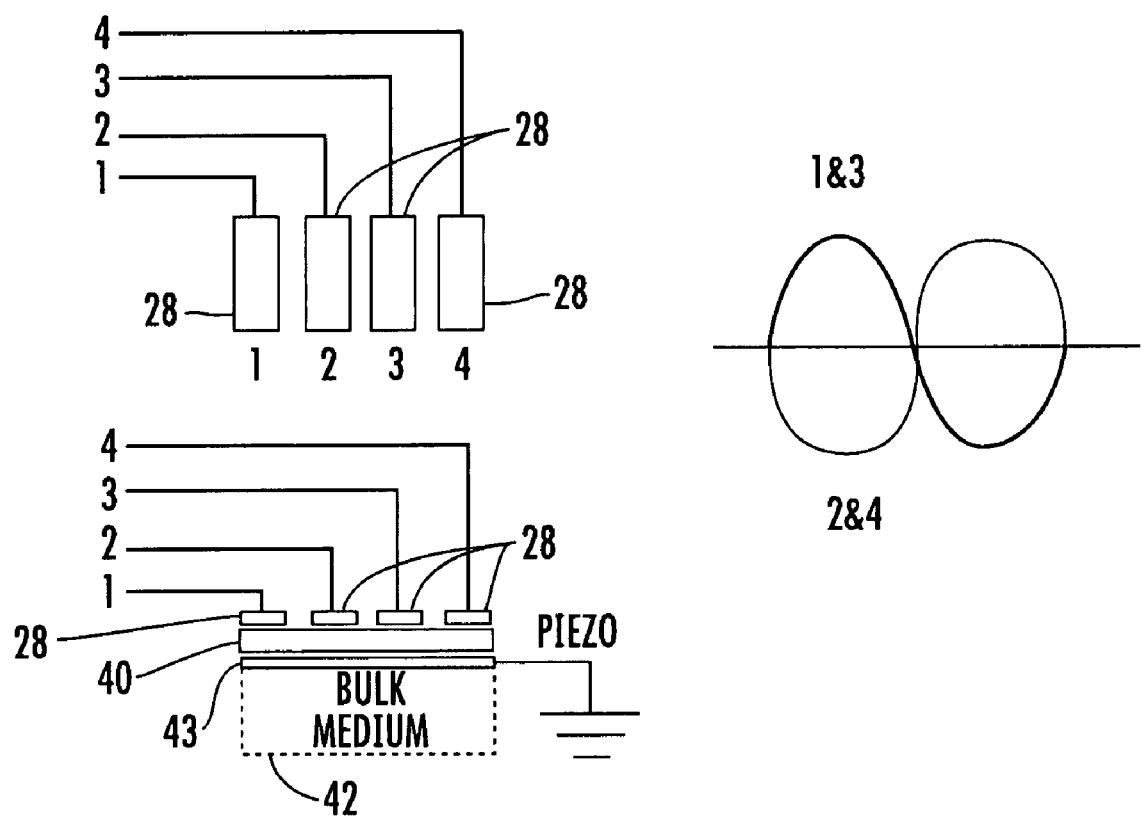
FIGS. 7 and 8 are fragmentary diagrams showing respective non-interdigitated and interdigitated drive connections for RE modulation and pulse optical intensity modulation allowing bi-phase RF modulation of an acousto-optic modulator in accordance with a non-limiting example of the present invention.
Figure 8:
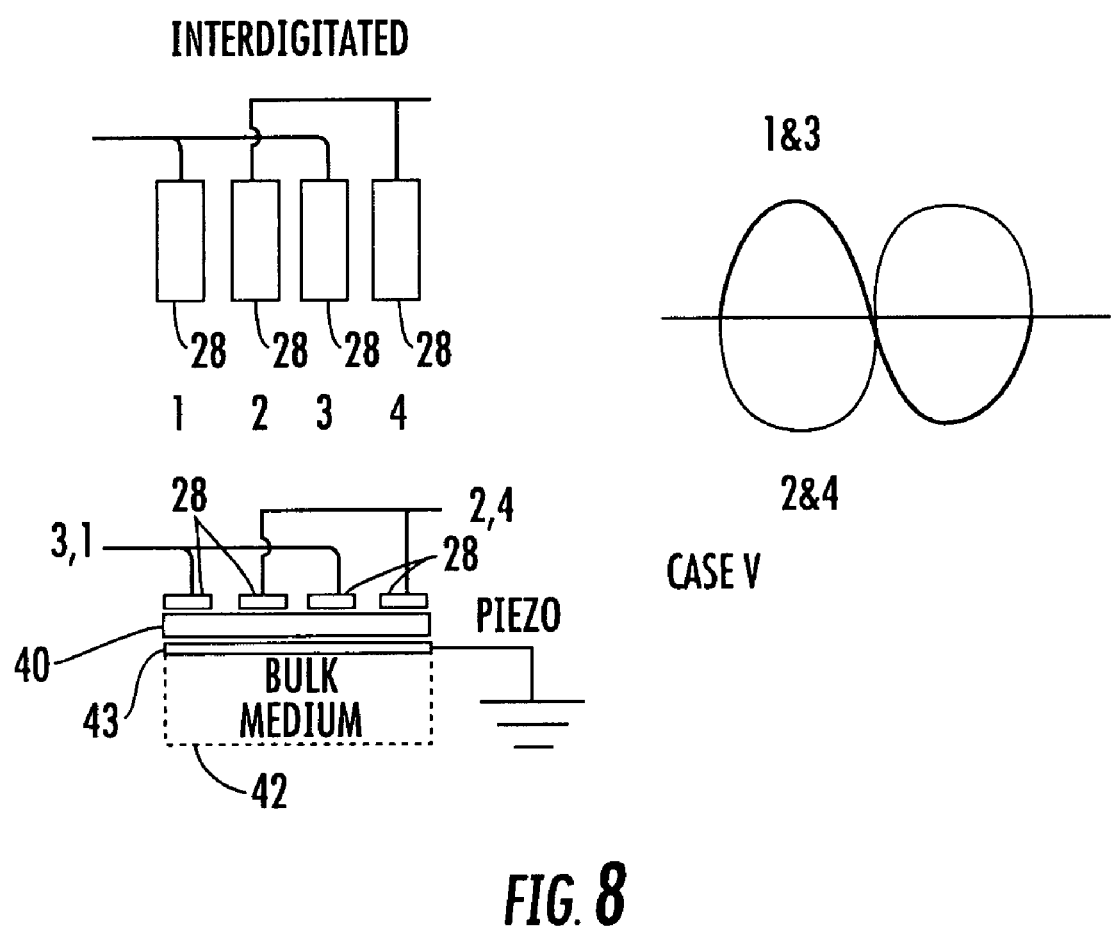

FIGS. 7-10 show details of an RF phase modulation technique for performing acousto-optic intensity modulation of an optical wavefront. In FIGS. 7 and 8, the electrodes are shown at 28. The transducer platelet 40 and ground plane 43 are attached to the bulk medium 42 as in FIG. 1.

For some applications using acousto-optic modulation to modulate the intensity of an optical beam, small deviations in the output angle of the diffracted beam are produced by local thermal transients that are introduced when the RF modulation waveform to the device is turned ON and OFF. These thermal transients can negatively impact the resolution of the focused spot produced in operation.

Current approaches for stabilizing the angular shift that occurs with conventional RF modulation waveforms rely on localized passive thermal approaches to minimize the magnitude and geometric variation of the temperature effects produced in the crystal, i.e., acousto-optic bulk medium. Active distributed thin film heating approaches have also been implemented, which require active monitoring and averaging of the input RF drive signal to provide compensatory thermal heating and generate a stationary thermal field at the transducer.

In accordance with a non-limiting example of the present invention, a phase modulated RE waveform of constant RF power imparts the desired optical modulation to the acousto-optic device, thereby eliminating or greatly reducing the generation of thermal transients within the bulk medium associated with conventional drive approaches.

The system and method, in accordance with a non-limiting example of the present invention, uses coherent phasing of the linear electrode array to alter the angular momentum distribution of the acoustic field and alternately allow and inhibit phase matching between the optical and acoustic field. This imparts the desired intensity modulation of the optical wavefront. The modulating RF waveform will be of constant average envelope power so that thermal transients produced by standard ON/OFF keying of the modulation RF waveform can be largely eliminated. The thermal profile within the acousto-optic bulk medium can remain essentially stationary as thermal energy generated in the transduction process at each transducer electrode is not dependent on the phase of the RF waveform. The effect of heat sources within the acousto-optic bulk medium due to acoustic attenuation of the radiated acoustic wavefront, will largely integrate optically as the average near field strain distribution remains essentially stationary.

The system and method can be applied to single and multichannel acousto-optic modulators and associated components used in semiconductor manufacturing and inspection. In particular, the angular deviations have been characterized and measured in existing 32-channel acousto-optic modulator devices, such as the Model H-600 series acousto-optic modulator manufactured by Harris Corporation of Melbourne, Fla.

Figure 9:
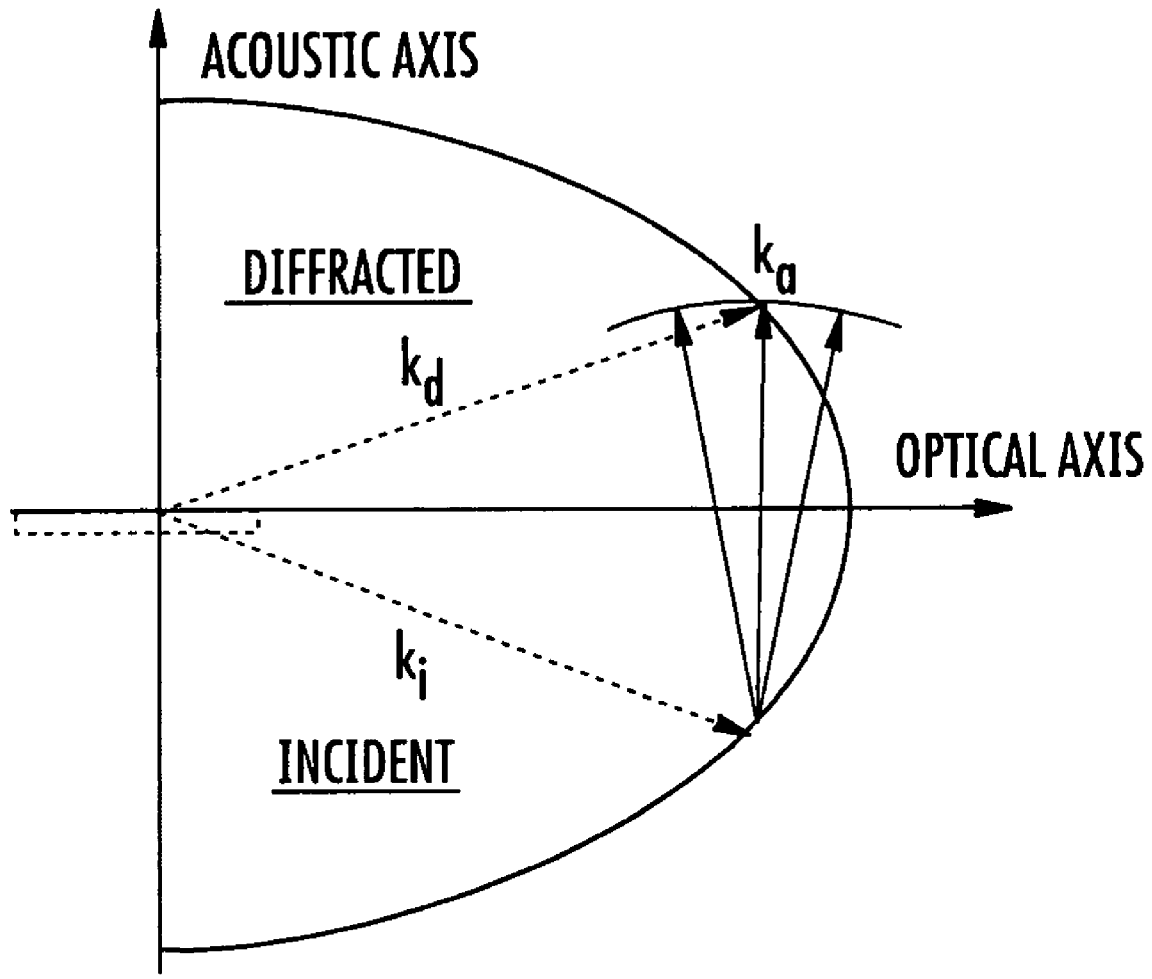
FIG. 9 is a graph showing results of the bi-phase RF modulation on the acousto-optic modulator and showing the acoustic axis and optical axis in accordance with a non-limiting example of the present invention.

FIG. 9 shows a wavevector diagram for isotropic acousto-optic interaction, where the normal phase matching condition with the transducer boresight wavevector is spoiled by applying a 180-degree phase shift between adjacent transducer elements comprising an ultrasonic transducer array having the necessary dimensions to support efficient diffraction of the incident light wave.

Figure 10:
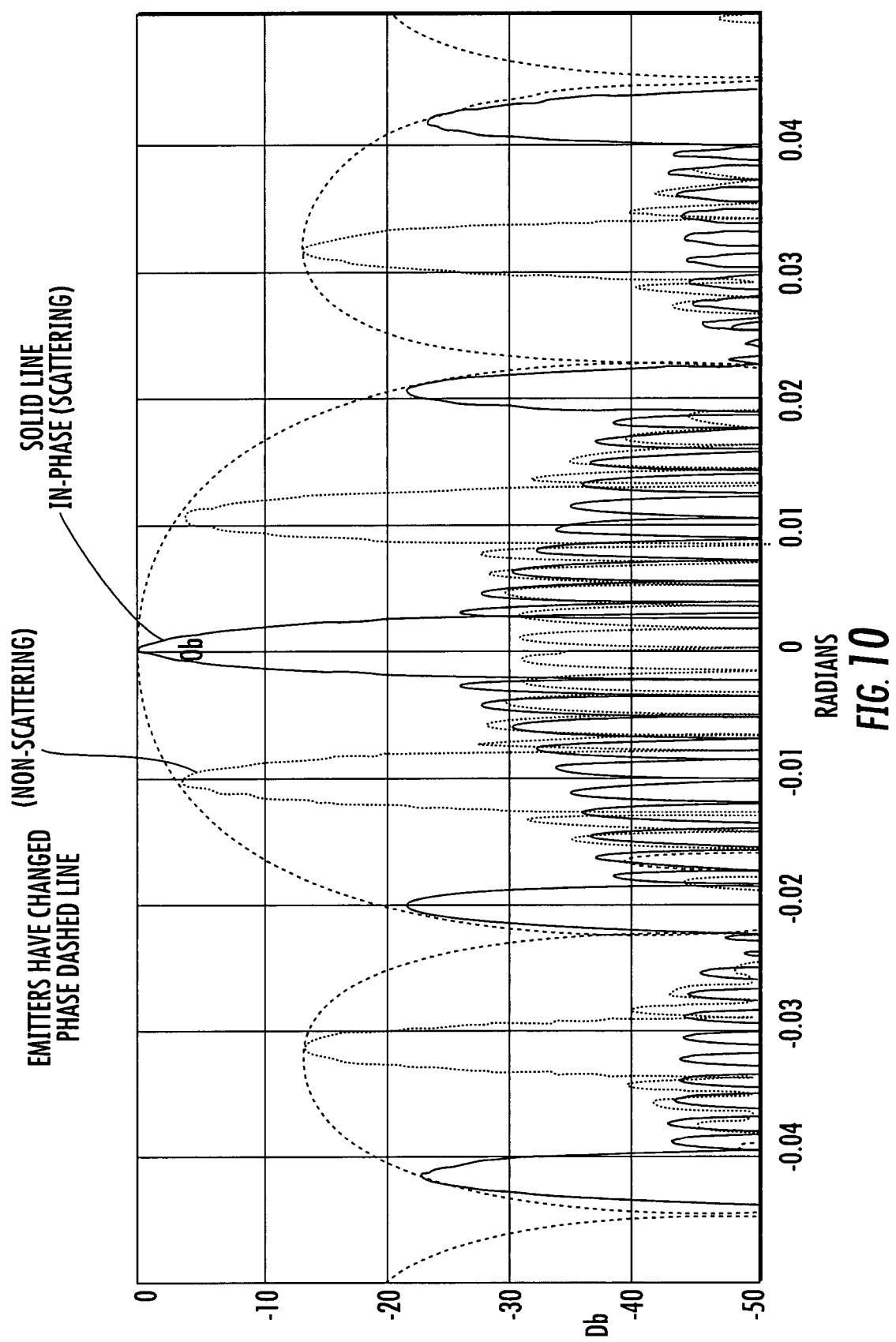
FIG. 10 is a graph showing the results of phase modulation on the acousto-optic modulator in accordance with a non-limiting example of the present invention.

FIG. 10 is a graph showing the calculated acoustic wavevector spectrum for the transducer array when transducer elements are in phase, and strong diffraction of the light occurs, and when the alternate element 180 degree bi-phase condition is applied, minimizing the acoustic energy which is now phase matched to the incident light. By judicious choice of the element spacing and careful control of phase errors, the residual level of scattering produced during the "off" state can be reduced to an acceptable level, typically 30 dB below the "on" state level. This contrast ratio is comparable or better than the level normally produced for AO modulation due to residual scatter of the optical wavefront by the optical medium.

FIGS. 7 and 8 show a non-interdigitated system (FIG. 7) and the interdigitated system (FIG. 8). It should be understood that the phase modulation for thermal control in both systems will adjust to the phase of alternate electrodes. As an acousto-optic transducer, two alternate sections are driven 180 degrees out-of-phase to create a specific radiation beam pattern in the acousto-optic bulk medium. There could be positive and negative connections as shown in the interdigitated system and a third connection as a ground plane connection.

FIG. 9 shows a graph as a K-space diagram. The K momentum vectors show phase matching. The incident and diffractive optical wave vectors are illustrated as $K_i$ and $K_d$ in the isotropic, acousto-optic bulk medium. The isotropic interaction allows scattering within a circle, resulting in a phase match between the light and sound fields.

As shown in FIG. 10, the lobes in the middle about the zero radians are diminished when the phase of alternate elements in the electrode structure are driven 180 degrees out of phase with their adjacent neighbors, as shown by the dashed lines. As shown at the central portion of the graph in FIG. 10, the energy is reduced about 30 decibels, acting similar to an ON/OFF scattering mode. Thus, the phase of alternate electrodes can be applied.

If the entire array were in-phase, the resultant solid lines would show light scattering. Thus, the system modulates or "turns off" by changing the phase of adjacent electrodes in a phased array system as described. This modulation scheme directly supports the use of lower cost amplifiers as compared to hybrid amplifier systems in which amplifiers are not distributed and may require higher power field effect transistors and higher power output stages. This would generally require increased heat sink capability to allow heat dissipation. It would also require higher operating voltages because the output intercept point of the amplifier has to be higher. At the same time, this modulation scheme may be implemented using a set of conventional hybrid amplifiers with each amplifier driving two interdigitated transducers, each with independent phase control, to effect modulation of the optical beam in the manner described above.

An additional benefit of using a plurality of low cost amplifiers to drive the transducer array involves an improvement in the ability to drive large transducers over larger fractional bandwidths. The radiation impedance defined by the electrodes is improved because the overall impedance is inversely proportional to the capacitance. Thus, by allowing segmented areas as described before, it is possible to drive the capacitance down with the smaller area.

This application is related to copending patent applications entitled, "LOW COST SYSTEM AND METHOD THAT IMPLEMENTS ACOUSTO-OPTIC (AO) RF SIGNAL EXCITATION," and "RF PHASE MODULATION TECHNIQUE FOR PERFORMING ACOUSTO-OPTIC INTENSITY MODULATION OF AN OPTICAL WAVEFRONT," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An acousto-optic modulator, comprising:
   an acousto-optic bulk medium;
   a transducer attached to said acousto-optic bulk medium and comprising an electrode circuit as a plurality of electrodes arranged in a linear configuration and a plurality of piezoelectric platelet segments in a linear configuration and attached to said bulk medium and supporting said electrode circuit such that a respective piezoelectric platelet segment supports a respective single electrode, wherein said piezoelectric platelet segments are configured for minimizing shear stress and susceptibility to fracture due to temperature extremes; and
   a transducer driver connected to said electrode circuit for driving said electrode circuit and comprising a plurality of amplifiers connected to the electrodes such that each electrode is individually driven by a respective single amplifier connected thereto to establish the amplitude and phase of each waveform imparted by an electrode and alter angular momentum distribution of an acoustic field and alternately allow and inhibit phase matching.

2. The acousto-optic modulator according to claim 1, and further comprising a means for generating the platelet segments without separating or otherwise affecting the common ground metal between the individual platelet segments and the acousto-optic bulk medium.

3. The acousto-optic modulator according to claim 1, wherein each amplifier comprises a monolithic microwave integrated circuit (MMIC).

4. The acousto-optic modulator according to claim 1, wherein said transducer driver further comprises a direct digital synthesizer (DDS) circuit that outputs arbitrary waveforms to each electrode.

5. The acousto-optic modulator according to claim 4, wherein said DDS circuit comprises a phase accumulator and one or more memory modules.

6. The acousto-optic modulator according to claim 5, wherein said phase accumulator comprises a complex programmable logic device.

7. The acousto-optic modulator according to claim 5, and further comprising a digital-to-analog converter (DAC) connected to said memory and each amplifier.

8. An acousto-optic modulator, comprising:
   an acousto-optic bulk medium;
   a piezoelectric transducer attached to said acousto-optic bulk medium and comprising a ground plane attached to the acousto-optic bulk medium, a plurality of piezoelectric platelet segments attached to the ground plane in a linear configuration, and a linear array of electrodes carried by the plurality of piezoelectric platelet segments such that a respective piezoelectric platelet segment supports a respective single electrode, wherein said plurality of piezoelectric platelet segments are configured to minimize shear stress and susceptibility to fracture due to temperature extremes; and
   a transducer driver connected to said electrodes for driving said electrodes and comprising a plurality of monolithic microwave integrated circuit (MMIC) amplifiers connected to the electrodes, and a drive controller connected to each MMIC amplifier such that each single electrode is phase driven by a respective single MMIC amplifier to establish the phase and amplitude of each electrode drive waveform and impart beam steering and establish the amplitude and phase of each waveform imparted by an electrode and alter angular momentum distribution of an acoustic field and alternately allow and inhibit phase matching.

9. The acousto-optic modulator according to claim 8, wherein said drive controller further comprises a direct digital synthesizer (DDS) circuit connected to each amplifier.

10. The acousto-optic modulator according to claim 9, wherein said DDS circuit comprises a phase accumulator and one or more memory modules.

11. The acousto-optic modulator according to claim 8, wherein said ground plane comprises a common ground metal between the platelet segments and the acousto-optic bulk medium.

12. The acousto-optic modulator according to claim 8, wherein said common ground metal is unseparated from said platelet segments.

* * * * *